United States Patent
Cho et al.

(10) Patent No.: US 9,684,844 B1
(45) Date of Patent: Jun. 20, 2017

(54) METHOD AND APPARATUS FOR NORMALIZING CHARACTER INCLUDED IN AN IMAGE

(71) Applicant: StradVision Korea, Inc., Gyeongbuk (KR)

(72) Inventors: Hojin Cho, Gyeongsangbuk-do (KR); Taewoong Jang, Gyeongsangbuk-do (KR)

(73) Assignee: StradVision, Inc., Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 15/211,416

(22) Filed: Jul. 15, 2016

(51) Int. Cl.
*G06K 9/42* (2006.01)
*G06K 9/34* (2006.01)

(52) U.S. Cl.
CPC ............... *G06K 9/42* (2013.01); *G06K 9/344* (2013.01); *G06K 2209/01* (2013.01)

(58) Field of Classification Search
CPC ................................................ G06K 9/00–9/82
See application file for complete search history.

(56) References Cited

U.S. PATENT DOCUMENTS

| | | | | |
|---|---|---|---|---|
| 4,162,482 A | * | 7/1979 | Su | G06K 9/56 382/202 |
| 4,769,851 A | * | 9/1988 | Nishijima | G06K 9/42 382/221 |
| 5,373,566 A | * | 12/1994 | Murdock | G06K 9/685 382/156 |
| 5,668,892 A | * | 9/1997 | Itonori | G06K 9/00449 382/177 |
| 5,684,891 A | * | 11/1997 | Tanaka | G06K 9/34 382/176 |
| 5,689,585 A | * | 11/1997 | Bloomberg | G06K 9/00469 382/229 |
| 6,256,408 B1 | * | 7/2001 | Casey | G06K 9/42 382/170 |
| 2005/0219581 A1 | * | 10/2005 | Dobashi | G06K 9/38 358/1.9 |
| 2007/0104376 A1 | * | 5/2007 | Jung | G06K 9/6821 382/229 |
| 2009/0060335 A1 | * | 3/2009 | Rodriguez Serrano | G06K 9/00194 382/177 |
| 2010/0008587 A1 | * | 1/2010 | Maekawa | G06K 9/40 382/195 |
| 2011/0057802 A1 | * | 3/2011 | Topfer | A61B 6/585 340/584 |
| 2012/0014601 A1 | * | 1/2012 | Jiang | G06F 1/1626 382/173 |
| 2012/0066213 A1 | * | 3/2012 | Ohguro | G06F 17/30654 707/723 |

(Continued)

*Primary Examiner* — Sean Motsinger
(74) *Attorney, Agent, or Firm* — Husch Blackwell LLP

(57) ABSTRACT

A method for normalizing at least one character included in an image is provided. The method includes steps of: (a) an apparatus for normalizing a specific character adding or supporting to add at least one margin, which is determined by referring to information on at least one another character related to the specific character detected in the image, around a bounding box which includes the specific character; and (b) the apparatus normalizing or supporting to normalize an area of the bounding box around which the at least one margin is added.

18 Claims, 6 Drawing Sheets
(3 of 6 Drawing Sheet(s) Filed in Color)

(56) References Cited

U.S. PATENT DOCUMENTS

| | | | | |
|---|---|---|---|---|
| 2012/0082377 A1* | 4/2012 | Laaser | ................... | G06K 9/32 |
| | | | | 382/165 |
| 2013/0039591 A1* | 2/2013 | De Muelenaere | ....... | G06K 9/44 |
| | | | | 382/224 |
| 2015/0169995 A1* | 6/2015 | Panferov | ............ | G06K 9/00463 |
| | | | | 382/182 |
| 2016/0210037 A1* | 7/2016 | Zhang | ................ | G06F 3/04883 |

\* cited by examiner

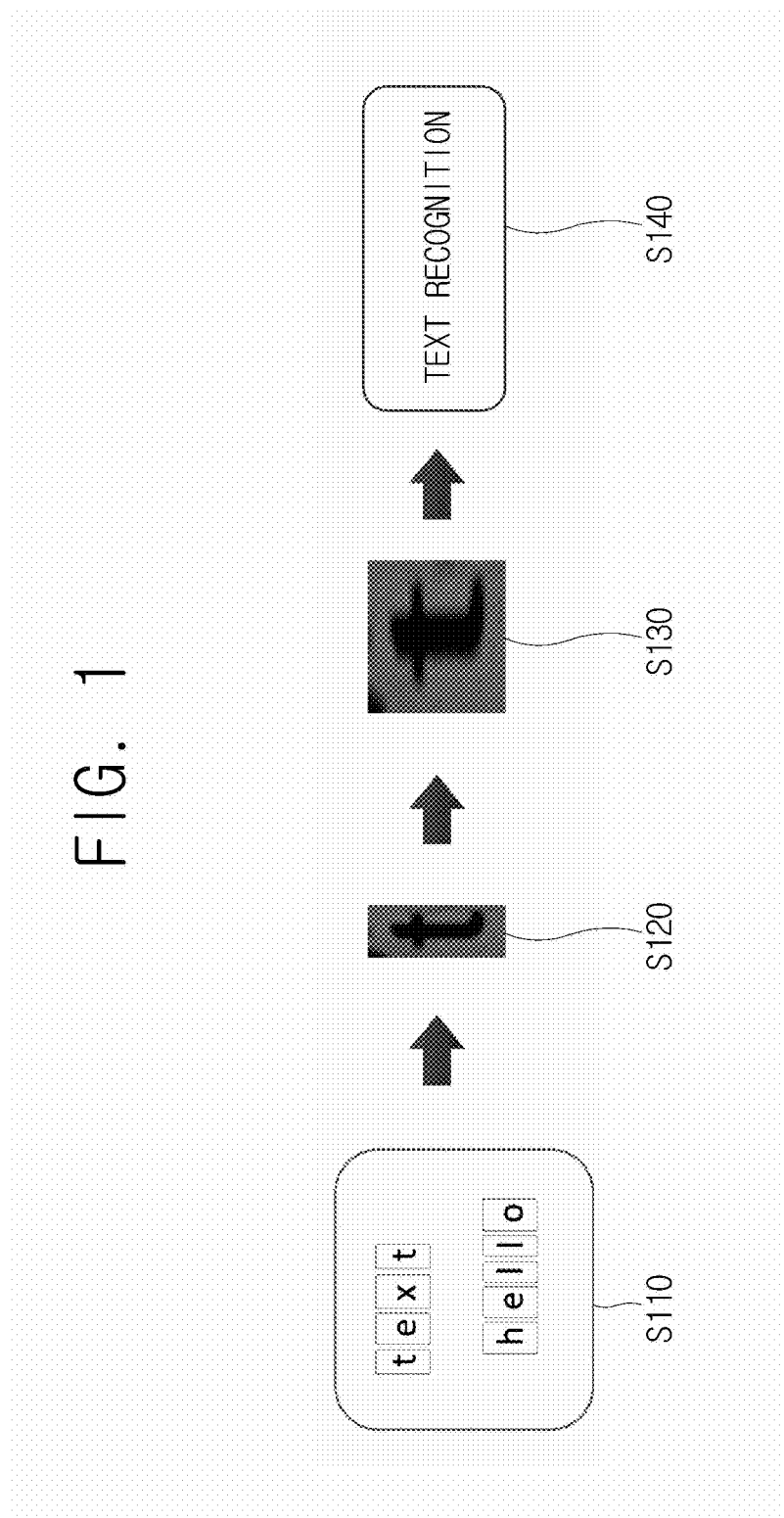

METHOD AND APPARATUS FOR NORMALIZING CHARACTER INCLUDED IN AN IMAGE

FIELD OF THE INVENTION

The present invention relates to a method, and an apparatus for normalizing a specific character included in an image, and more particularly, to the method and the apparatus for performing a process for adding or supporting to add at least one margin, which is determined by referring to information on at least one character related to the specific character detected in the image, around a bounding box which includes the specific character and for normalizing or supporting to normalize an area of the bounding box around which the at least one margin is added.

BACKGROUND OF THE INVENTION

Detecting and recognizing texts in images have been considered to be important in a variety of applications for computer vision such as image and video retrieval, multi-language translator, and automotive assistance because in many cases texts in images provide significant information.

FIG. 1 is a block diagram illustrating a process of detecting and recognizing a text included in an image.

By referring to FIG. 1, the text in the image, first of all, is detected at a step of S110. A text detection algorithm is an algorithm for detecting a text (or a character) in an image, which may be largely divided into a sliding window-based method and a connected component analysis-based method, depending on methods for extracting text candidates.

If individual characters included in the image are detected through text detection at a step of S120, the individual characters become normalized at a step of S130. The detected text may be included in a bounding box area that minimizes an extra margin(s). By the way, as sizes of the bounding boxes of the individual characters are different, the sizes must be made equally (e.g., 32×32 pixels or 48×48 pixels) and this is called normalization. After the normalization, the characters may be recognized at a step of S140.

There are a variety of conventional normalization methods. For example, a stretching (scaling) method, a replicating method, a constant method, a reflecting method, a wrapping method, etc.

FIGS. 2A to 2E are drawings illustrating a variety of conventional normalization methods.

FIG. 2A shows a stretching (scaling) method for controlling a scale of a bounding box. But this method has a drawback in that it may distort a shape of a character depending on a proportion of a width thereof to a height thereof.

FIG. 2B illustrates a replicating method which copies boundary values and inserts the copied boundary values into a bounding box. This method has a disadvantage in that it includes too much background information in the bounding box. In particular, if there is any noise in the boundary values as shown in FIG. 2B, the noise may appear being emphasized in the bounding box.

FIG. 2C shows a constant method which makes a constant value be included in a bounding box. A problem of this method is that a constant value irrelevant to a character or a background is put into the bounding box.

FIG. 2D is a reflecting method which makes a mirror image of a character be included in a bounding box. Even in this method, a background is included too much in the bounding box.

FIG. 2E is a wrapping method which inserts an image of a character in a bounding box like a repetitive pattern of tile. Also in this method, a background is included too much in the bounding box.

As such, the individual conventional normalization methods had many limitations. Therefore, a method for performing normalization by adding a margin(s) around a bounding box, which includes a detected character, has been suggested.

FIGS. 3A to 3C are drawings explaining limitations of conventional technologies that perform normalization by adding margins around bounding boxes.

Rectangular areas displayed on upper sides, respectively, in FIGS. 3A and 3B show the bounding boxes that include characters detected from an image and those displayed on lower sides show those on which normalization has been performed.

By referring to FIG. 3A, if normalization is performed without any separate additional operations regarding the result of the detected characters, it can be found that characters with narrow widths such as 'l' or 'i' are almost one-colored. In this case, recognition rates of these characters may be lowered.

FIG. 3B illustrates a case of performing normalization by adding at least one margin around bounding boxes. This case is slightly better than that compared to that in FIG. 3A but it could be found that it still has a problem of character recognition rates being lowered because the characters with narrow widths are almost single-colored.

This problem may appear even in a case where a character in a narrow-type font is recognized. In an example of the narrow-type font such as FIG. 3C, it could be found that the aforementioned problem may occur with regard to characters including not only 'I' but also 'O'. According to the conventional technology, there was a problem that only the absolute widths of characters are considered without any consideration for influences of character fonts.

As such, all the conventional normalization technologies had limitations so that the applicant came to reach the invention on a new normalization method. Specifically, the applicant invented a technology that may increase character recognition rates because it came to allow even a specific character with a narrow width to be recognized as it is by adding at least one margin, which is determined by referring to information on at least one another character related to the specific character detected in an image, around a bounding box that includes the specific character and then performing normalization.

SUMMARY OF THE INVENTION

It is an object of the present invention to solve all the aforementioned problems.

It is another object of the present invention to provide a technology capable of allowing even a specific character with a narrow width to be recognized as it is and increasing character recognition rates by adding at least one margin, which is determined by referring to information on at least one another character related to the specific character detected in an image, around a bounding box that includes the specific character and then performing normalization with regard to the specific character.

In accordance with one aspect of the present invention, there is provided a method for normalizing at least one character included in an image, including steps of: (a) an apparatus for normalizing a specific character adding or supporting to add at least one margin, which is determined by referring to information on at least one another character related to the specific character detected in the image, around a bounding box which includes the specific character; and (b) the apparatus normalizing or supporting to normalize an area of the bounding box around which the at least one margin is added.

In accordance with another aspect of the present invention, there is provided an apparatus for normalizing at least one character included in an image, including: a communication part for acquiring the at least one character, including a specific character, detected in the image; and a processor for adding or supporting to add at least one margin, which is determined by referring to information on at least one another character related to the specific character detected in the image, around a bounding box which includes the specific character; and normalizing or supporting to normalize an area of the bounding box around which the at least one margin is added.

BRIEF DESCRIPTION OF THE DRAWINGS

The above and other objects and features of the present invention will become apparent from the following description of preferred embodiments given in conjunction with the accompanying drawings, in which:

FIG. 1 is a block diagram illustrating a process of detecting and recognizing a text included in an image.

Figure 2A:
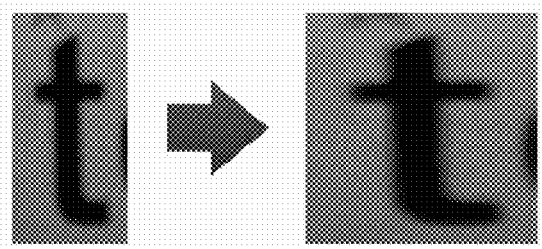
FIGS. 2A to 2E are drawings illustrating a variety of conventional normalization methods.
Figure 2B:
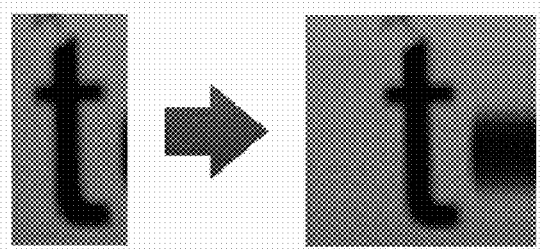
Figure 2C:
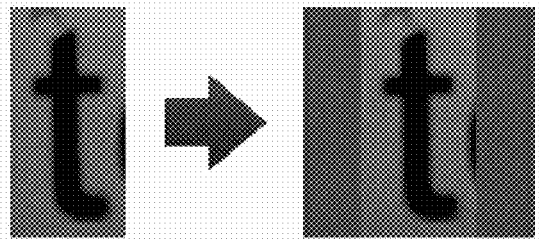
Figure 2D:
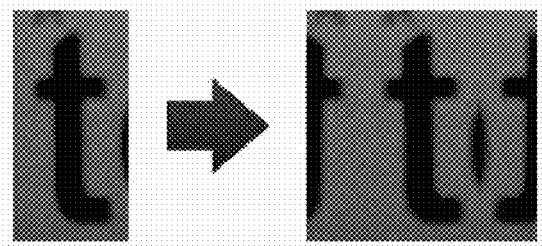
Figure 2E:
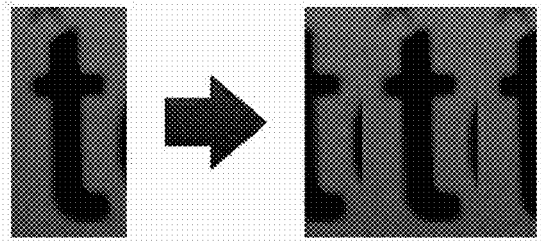
Figure 3A:
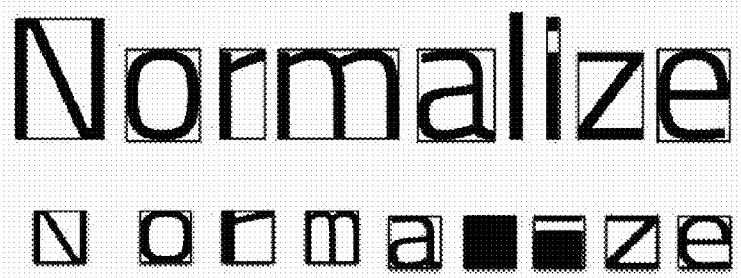
FIGS. 3A to 3C are drawings explaining limitations of conventional technologies that perform normalization by adding margins around bounding boxes.
Figure 3B:
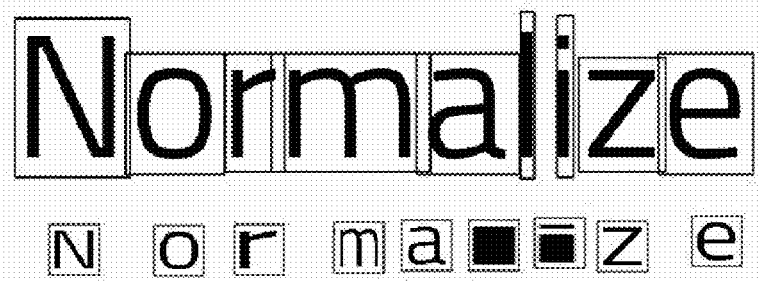
Figure 3C:

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

To make purposes, technical solutions, and advantages of the present invention clear, reference is made to the accompanying drawings that show, by way of illustration, more detailed example embodiments in which the invention may be practiced. These embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 4:
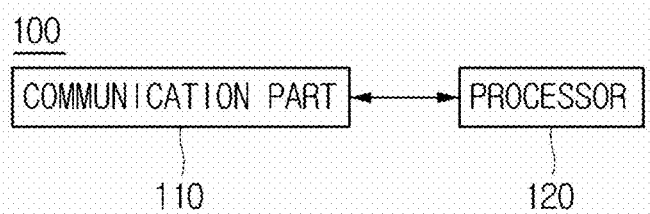
FIG. 4 is a block diagram representing a configuration of an apparatus for normalizing a character included in an image in accordance with one example embodiment of the present invention.

FIG. 4 is a block diagram representing a configuration of an apparatus for normalizing a character included in an image in accordance with one example embodiment of the present invention.

By referring to FIG. 4, the apparatus 100 for normalizing a character included in an image in accordance with one example embodiment of the present invention includes a communication part 110 and a processor 120.

The communication part 110 has a configuration of transmitting and receiving data to/from an external device or among internal components. In particular, the communication part 110 may acquire information on the character detected from the image.

The processor 120 is a configuration that applies various operations to a variety of data. First of all, the processor 120 may determine or support to determine at least one margin by referring to information on at least one another character related to a specific character detected from the image. As a result, it may add or support to add the at least one margin around a bounding box that includes the specific character.

Herein, the at least another character related to the specific character may be at least part of a character(s) adjacent to the specific character and another character(s) included in a group that contains the specific character. For example, the at least one another character may be included in a group of characters that makes a same sentence with the specific character.

Besides, the information on the at least one another character may be a width of the at least one another character. In this case, the margin to be added around the bounding box may be determined by referring to the width of the at least one another character.

As another example, the margin to be added around the bounding box may also be determined by referring to the width of the at least one another character and the width of the specific character at the same time. For example, the margin to be added around the bounding box may be determined by referring to a mean value or a median value of the width of the specific character and that of the at least one another character.

If total number of all the characters including the specific character and the at least one another character is odd, the width of a character located in a center among all the characters may be determined as a median value. In contrast, if total number of all the characters including the specific character and the at least one another character is even, a width of either of two characters located near a center among all the characters or the mean value of widths of the two characters located near the center may be determined as a median value.

The margin determined when the width of the specific character is less than the mean value or the median value of those of all the characters including the specific character and the at least one another character may be set to be greater than that determined when the width of the specific character is greater than or equal to the mean value or the median value of those of all the characters.

For one example, the at least one margin may include a vertical margin and a horizontal margin. If the width of the specific character is less than the mean value or the median value of the widths of all the characters, the horizontal margin may be calculated (1) by adding (i) a difference value between the mean value or the median value of the widths of all the characters and the width of the specific character to (ii) a value multiplying the mean value or the median value of the widths of all the characters by a first value. However, if the width of the specific character is greater than or equal to the mean value or the median value of the widths of all the characters, the horizontal margin may be calculated (2) by multiplying the width of the specific character by a second value. Herein, the first value and the second value may be equal but it is not limited to this.

Besides, the vertical margin may be calculated by multiplying a height of the specific character by a specified value.

The processor 120 may normalize or support to normalize an area of the bounding box where the at least one margin is added and may recognize or support to recognize a character included in the normalized area of the bounding box.

Figure 5:
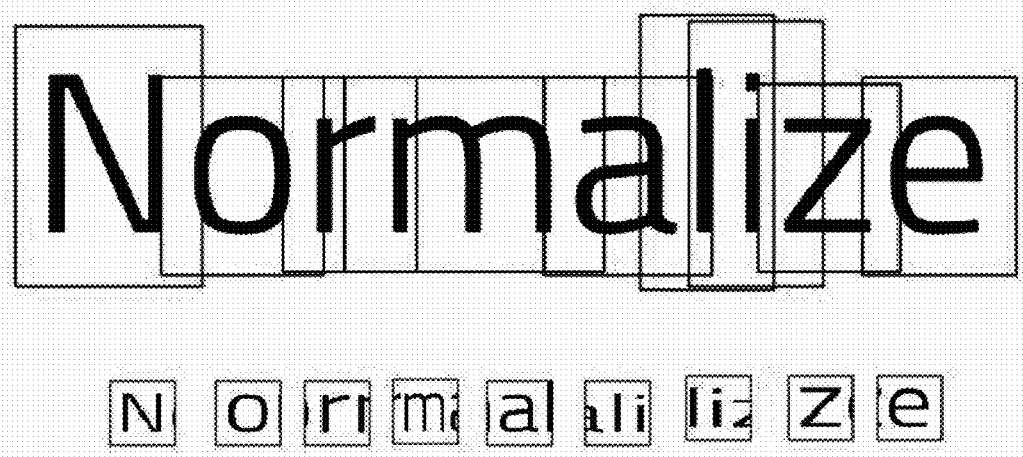
FIG. 5 is a drawing showing a method for normalizing detected characters and a result of the normalization in accordance with one example embodiment of the present invention.

FIG. 5 is a drawing showing a method for normalizing detected characters and the result of the normalization in accordance with one example embodiment of the present invention.

As illustrated in FIG. 5, the present invention may allow even characters with narrow widths to be recognized as they are and then increase character recognition rates by adding at least one margin, which is determined by referring to information on at least one another character related to a specific character detected in an image, around a bounding box that includes the specific character and applying a normalization process to the bounding box where the margin is added.

For example, based on a median value of widths of characters included in a word, if widths of the individual characters are less than the median value, bounding boxes are scaled up to set the widths of the bounding boxes to be equal to the median value and then the normalization process is applied to the respective bounding boxes.

Additionally, it could be found that even long characters such as '1' or 'I' keep their original shapes. The performance of the apparatus for normalizing a character may be improved because the apparatus is learned to recognize a character located at a center of a bounding box. Herein, the "a character located at a center" means a character located at a center among multiple characters included in a bounding box, as shown in some bounding boxes in the lower part of FIG. 5.

Meanwhile, the processor 120 performs a function of controlling data flow between the communication part 110 as explained above and other components. In short, the processor 120 controls individual unique functions in the communication part 110 and other components by controlling data flow among the components of the apparatus 100.

The processor 120 may include hardware features such as micro processing unit (MPU), central processing unit (CPU), cache memory, and data bus. Moreover, it may further include software features such as an operating system and applications that perform certain purposes.

The present invention has an effect of increasing character recognition rates by allowing even characters with narrow widths to be recognized as they are.

The present invention has another effect of robust recognition by identifying whether a character is wide or narrow regardless of a font thereof and treating a character with a narrow width as an exception (i.e., applying a padding process to the character with a narrow width) in use of a mean value or a median value of the widths of characters in a text group.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for normalizing at least one character included in an image, comprising steps of:
   (a) an apparatus normalizing a specific character adding at least one margin, which is determined by referring to information on at least one another character related to the specific character detected in the image, around a bounding box which includes the specific character; and
   (b) the apparatus normalizing an area of the bounding box around which the at least one margin is added,
   wherein the at least one margin includes a vertical margin and a horizontal margin; and
   wherein, if a width of the specific character is less than a mean value or a median value of widths of all characters including the specific character and the at least one another character, the horizontal margin is calculated (1) by the sum of (i) a difference value between the mean value or the median value of the widths of all the characters and the width of the specific character and (ii) a value which is acquired by multiplying the mean value or the median value of the widths of all the characters by a first value, and wherein, if the width of the specific character is greater than or equal to the mean value or the median value of the widths of all the characters, the horizontal margin is calculated (2) by multiplying the width of the specific character by a second value.

2. The method of claim 1, wherein the information on the at least one another character means a width of the at least one another character.

3. The method of claim 1, wherein the margin to be added around the bounding box is determined by referring to a width of the specific character and a width of the at least one another character at the same time.

4. The method of claim 3, wherein the margin to be added around the bounding box is determined by referring to a mean value or a median value of the width of the specific character and that of the at least one another character.

5. The method of claim 4, wherein, if total number of all characters including the specific character and the at least one another character is even, the apparatus decides a mean value of widths of two characters located near a center among all the characters as the median value.

6. The method of claim 1, wherein the margin determined when a width of the specific character is less than a mean value or a median value of those of all characters including the specific character and the at least one another character is set to be greater than that determined when the width of the specific character is greater than or equal to the mean value or the median value of those of all the characters.

7. The method of claim 1, wherein the vertical margin is calculated by multiplying a height of the specific character by a specified value.

8. The method of claim 1, wherein the at least one another character related to the specific character is at least part of a character adjacent to the specific character and another character included in a group that contains the specific character.

9. The method of claim 1, further comprising a step of: (c) the apparatus recognizing the specific character in the normalized area of the bounding box.

10. An apparatus for normalizing at least one character included in an image, comprising:
 a communication part for acquiring the at least one character, including a specific character, detected in the image; and
 a processor for adding at least one margin, which is determined by referring to information on at least one another character related to the specific character detected in the image, around a bounding box which includes the specific character; and normalizing an area of the bounding box around which the at least one margin is added,
 wherein the at least one margin includes a vertical margin and a horizontal margin; and
 wherein, if a width of the specific character is less than a mean value or a median value of widths of all characters including the specific character and the at least one another character, the horizontal margin is calculated (1) by the sum of (i) a difference value between the mean value or the median value of the widths of all the characters and the width of the specific character and (ii) a value which is acquired by multiplying the mean value or the median value of the widths of all the characters by a first value, and wherein, if the width of the specific character is greater than or equal to the mean value or the median value of the widths of all the characters, the horizontal margin is calculated (2) by multiplying the width of the specific character by a second value.

11. The apparatus of claim 10, wherein the information on the at least one another character means a width of the at least one another character.

12. The apparatus of claim 10, wherein the margin to be added around the bounding box is determined by referring to a width of the specific character and a width of the at least one another character at the same time.

13. The apparatus of claim 12, wherein the margin to be added around the bounding box is determined by referring to a mean value or a median value of the width of the specific character and that of the at least one another character.

14. The apparatus of claim 13, wherein, if total number of all characters including the specific character and the at least one another character is even, the processor decides a mean value of widths of two characters located near a center among all the characters as the median value.

15. The apparatus of claim 10, wherein the margin determined when a width of the specific character is less than a mean value or a median value of those of all characters including the specific character and the at least one another character is set to be greater than that determined when the width of the specific character is greater than or equal to the mean value or the median value of those of all the characters.

16. The apparatus of claim 10, wherein the vertical margin is calculated by multiplying a height of the specific character by a specified value.

17. The apparatus of claim 10, wherein the at least one another character related to the specific character is at least part of a character adjacent to the specific character and another character included in a group that contains the specific character.

18. The apparatus of claim 1, wherein the processor recognizes the specific character in the normalized area of the bounding box.

* * * * *